Figure 1:
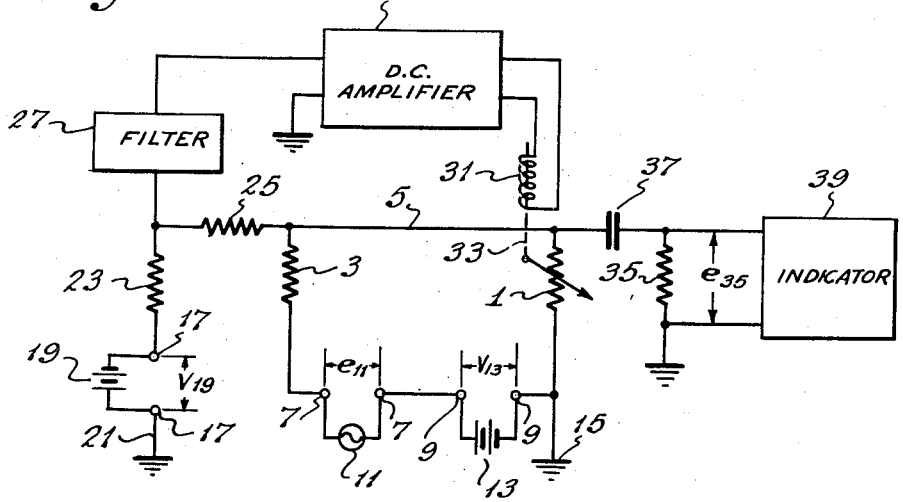

Jan. 6, 1953 — W. G. WING — 2,624,505

COMPUTER

Filed May 2, 1950

INVENTOR.
WILLIS G. WING
BY Paul B. Hunter
ATTORNEY

Patented Jan. 6, 1953

2,624,505

UNITED STATES PATENT OFFICE 2,624,505

COMPUTER

Willis G. Wing, Roslyn Heights, N. Y., assignor to The Sperry Corporation, a corporation of Delaware Application May 2, 1950, Serial No. 159,560

13 Claims. (Cl. 235—61)

This invention relates to simplified electronic computing apparatus.

In accordance with a preferred embodiment of the present invention, a fixed resistor and a variable resistor are serially connected to form a voltage divider circuit. A source of alternating current voltage and a first source of direct current voltage are serially connected and connected across the voltage divider. The direct current voltage produced at the output of the divider is compared with a second source of direct current voltage of opposite polarity and a control signal is produced having its magnitude and polarity determined by the difference between the voltage at the output of the divider and the voltage of the second source. This control signal is amplified by a direct current amplifier and the output of the direct current amplifier is employed to control the resistance of the variable resistance element of the voltage divider so as to cause the control signal to approach zero magnitude. An indicator device is employed to measure the amplitude of the alternating current signal at the output of the voltage divider.

The invention is based upon the fact that the ratio of the amplitude of the alternating current signal at the output of the voltage divider to the amplitude of the signal produced by the alternating current signal source is equal to the ratio of the magnitude of the voltage produced by the second direct current source to the magnitude of the voltage produced by the first direct current source. Hence, if the amplitude of the signal produced by the alternating signal source is considered to be unity, the amplitude of the alternating current signal at the output of the divider is equal to the ratio of the magnitude of the voltage produced by the second source of direct current potential divided by the magnitude of the voltage produced by the first source of direct current potential. Also, if the magnitude of the voltage produced by the first source of direct current potential is considered to be unity, the amplitude of the alternating current signal at the output of the divider is equal to the product of the magnitude of the voltage produced by the second source of direct current potential and the amplitude of the signal produced by the alternating current signal source.

Copending application Serial No. 474,052 filed by Herbert Harris, Jr., now Patent No. 2,497,883, issued February 21, 1950, discloses electronic computing apparatus for effecting multiplication and/or division. However, the device disclosed in the Harris application is rather complex and is primarily adapted for use in systems in which alternating current signals are employed to represent the quantities to be multiplied or divided. The present invention is an improvement over the device disclosed by Harris.

It is an object of this invention to provide simplified electronic computing apparatus which is inexpensive and easy to operate.

Another object of the invention is to provide apparatus for producing an output voltage which varies as the product of two voltages divided by a third voltage.

A further object of the invention is to provide apparatus for producing an output voltage which varies as the product of an alternating current voltage and a direct current voltage divided by a direct current voltage.

Figure 2:
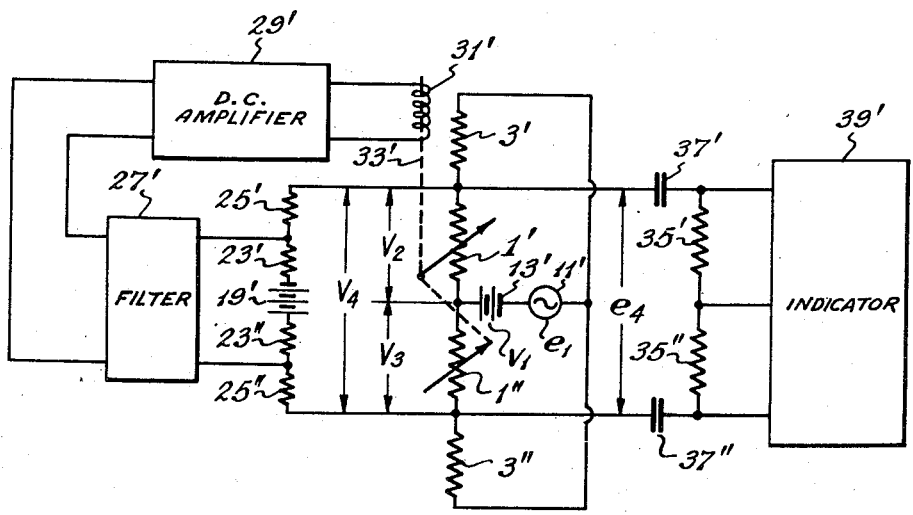

Other objects and advantages of the invention will be apparent from the following description, the appended claims, and the drawing, in which Fig 1 shows a schematic diagram of a preferred embodiment of the invention; and Fig. 2 shows a modification of the apparatus shown in Fig. 1 wherein a double or "push pull" computer network is employed.

Referring now to Fig. 1, a variable resistor 1 is connected in series with a fixed resistor 3 to form a voltage divider having an output lead 5. Preferably, the variable resistor 1 is a carbon pile type. In order to obtain maximum accuracy in the computations, the resistors 1 and 3 should offer the same impedance to the current supplied by the alternating current source 11 as to the current supplied by the battery 13. This is easily achieved by using carbon resistors.

Terminals 7 and 9 are provided for connecting the source of alternating current signals 11 and the battery 13 in series across the voltage divider circuit. The junction between the variable resistor 1 and the battery 13 is grounded at 15.

Thus, the magnitude of the direct current voltage and the amplitude of the alternating current voltage between the lead 5 and ground are variable and are determined by the resistance of the variable resistor 1.

A pair of terminals 17 is provided for connecting a battery 19 to the computer circuit. Batteries 13 and 19 are connected so that terminals of opposite polarity of the two batteries are interconnected through the ground connections 15 and 21. The voltage produced by the battery 13 must be larger than the voltage produced by the battery 19 as will be explained hereinafter.

The voltages between the ungrounded terminal of terminals 17 and the lead 5 are compared by means of a pair of resistances 23 and 25 connected therebetween. Preferably, the resistance of each of the resistors 23 and 25, is equal and is many times (e. g., one-hundred times) larger than the resistance of either the variable resistor 1 or the fixed resistor 3 of the divider.

The magnitude and polarity of the direct current voltage produced at the junction between resistors 23 and 25 is determined by the relative magnitudes of the voltage between the lead 5 and ground and the voltage produced by the battery 19.

A filter 27 is connected to the junction between resistors 23 and 25. This filter 27 may be a conventional band rejection type adapted to reject the alternating current signals produced by the source 11 while passing the control signals produced by the comparison at the junction of resistors 23 and 25 of the voltage produced by the battery 19 and the voltage between the lead 5 and ground.

The output of the filter 27 is applied to the input of a direct current amplifier 29 which is preferably a high gain type which produces substantially constant amplification regardless of variations in the power supply voltages, the characteristics of the vacuum tubes or the circuit constants. Such amplifiers are well known and will not be described herein.

It will be apparent that the filter 27 may be omitted if the amplifier 29 is a type which will not amplify the signals produced by the source 11.

The output of the direct current amplifier 29 is applied to a solenoid 31 which serves to actuate a plunger 33 which in turn controls the resistance of the variable resistor 1. The output of the amplifier 29 is applied to the solenoid 31 in such polarity that plunger 33 causes the resistance of the variable resistor 1 to vary so as to cause the input voltage to the amplifier 29 to be substantially zero. Thus, due to the servo action of the circuit, the magnitude of the direct current voltage between lead 5 and ground is caused to be substantially equal to the magnitude of the voltage of the battery 19.

The alternating current signal which is provided across the variable resistor 1 by source 11 to lead 5 is applied across a load resistor 35 through a condenser 37. Preferably, the condenser 37 offers a very low impedance to the alternating current signals, and the resistance of resistor 35 should be large so that the peak value of the output signal may be measured by means of an indicator 39 which is connected across the resistor 35. The indicator 39 may be a vacuum tube voltmeter or any other suitable utilization device.

Since the servo action of the computer circuit causes the direct current voltage between the lead 5 and ground to be substantially equal to the voltage of the battery 19, it will be apparent that the voltage relationships in the computer circuit are as follows:

$$\frac{e_{35}}{e_{11}} = \frac{V_{19}}{V_{13}} \text{ or } e_{35} = \frac{e_{11} \times V_{19}}{V_{13}}$$

where $e_{35}$ is the amplitude of the alternating current output voltage across the resistor 35, $e_{11}$ is the amplitude of the alternating current voltage produced by the source 11, $V_{19}$ is the magnitude of the voltage of the battery 19, and $V_{13}$ is the magnitude of the voltage of the battery 13.

Thus, if any three of the voltages indicated in the above equation represent known numbers, the fourth voltage represents a fourth member which is related to the other three numbers in accordance with the equation. Division or multiplication, or division and multiplication may be achieved.

It is to be observed that the voltage of battery 13 must be larger than the voltage of battery 19 since the direct current voltage between the lead 5 and ground is caused to be equal to the voltage of battery 19 due to the action of the divider 1, 3. The relative magnitudes of the voltages $V_{13}$ and $V_{19}$ which may be employed are therefore somewhat limited and the limitation is determined by the voltage drop across the variable resistor 1.

If a carbon pile resistor is employed as the adjustable resistor 1, the solenoid 31 must be continuously energized during each computation in order to maintain the proper pressure on the carbon pile resistance element by means of the plunger 33. In this case a small error signal is continuously applied to the direct current amplifier 29, and the magnitude of the voltage between the lead 5 and ground differs slightly from the voltage produced by the battery 19. However, this does not appreciably affect the accuracy of the computer since only very small error signals are required because of the large amplification produced by the amplifier 29.

In order to obtain maximum accuracy in the computations, the sum of the impedances of the two signal sources 11 and 13 should be substantially equal for both the direct current provided by the battery 13 and the alternating current provided by signal source 11. If the resistance of resistors 1 and 3 is large in comparison with the sum of the impedances of the two sources 11 and 13, the effects of any difference between the direct current impedance and the alternating current impedance of sources 11 and 13 can be minimized.

The alternating current signal produced by the source 11 may be sinusoidal or any other recurrent wave form which has a frequency which is appreciably larger than the frequency of the signal produced as a result of the comparison of the direct current voltage between the lead 5 and ground and the direct current voltage produced by the battery 19.

It will be apparent that the resistors 1 and 3 may be interchanged if desired.

Also, the device may be modified so that source 11 supplies direct current and sources 13 and 19 supply alternating current. In this case the filter 27 is omitted, the amplifier 29 is a type responsive to alternating current, and the indicator 39 is a type responsive to direct current.

In the simple form of device which has previously been described the range of operation is limited by the finite range of variation of the variable resistance element. Since the multiplication performed is simply the multiplication of the input by the resistance ratio and it is impossible for this ratio to be negative, it follows that the output must always have the same sign as the input. For many purposes this is an undesirable limitation and for such uses a "push-pull" arrangement may be used.

In the "push-pull" arrangement shown in Fig. 2 two voltage divider circuits of the type disclosed in Fig. 1 are used with the connections to the control elements of the variable resistors being such that one ratio increases as the other decreases. If a common voltage is applied to the two dividers, the difference voltage at their outputs may be either positive or negative depending upon which ratio is the greater.

In Fig. 2, elements designated by the primed numbers correspond to the elements designated by the unprimed numbers in Fig. 1. These elements are the same as those shown in Fig. 1 except that the indicator 39' should be a push-pull type.

For the apparatus shown in Fig. 2, $$\frac{V_4}{V_1} = \left[\frac{R_{1'}}{R_{3'}+R_{1'}} - \frac{R_{1''}}{R_{1''}+R_{3''}}\right]$$

and the ratio $$\frac{V_4}{V_1}$$

is either positive or negative depending upon which term in the equation is the greater.

Since $e_1$ is impressed on the same circuit, $$\frac{e_4}{e_1} = \frac{V_4}{V_1} \text{ or } e_4 = \frac{e_1 \times V_4}{V_1}$$

and the ratio $$\frac{e_4}{e_1}$$

can also be either positive or negative.

Since many changes could be made in the above construction and many apparently widely different embodiments of this invention could be made without departure from the scope thereof, it is intended that all matter contained in the above description or shown in the accompanying drawing shall be interpreted as illustrative and not in a limiting sense.

What is claimed is:

1. In combination, an adjustable voltage divider, means for connecting a first and a second source of potential in series and across said voltage divider, means for comparing the signal produced at the output of said divider by said first source of potential with a reference signal to produce a control signal, and means responsive to said control signal for adjusting said voltage divider.

2. The combination of claim 1, wherein said voltage divider has two parallel connected branches and each branch comprises an adjustable resistor and a fixed resistor serially connected.

3. In combination, an adjustable voltage divider, means for connecting a first source of direct current voltage and a source of alternating current voltage in series and across said voltage divider, means for comparing the direct current voltage at the output of said divider with the voltage of a second source of direct current voltage to produce a control signal, and means responsive to said control signal for adjusting said voltage divider and causing said control signal to be maintained at substantially zero potential, whereby the ratio of the amplitude of the alternating current voltage at the output of the voltage divider and the amplitude of the signal produced by said source of alternating current voltage is substantially equal to the ratio of the voltages produced by said second and said first sources of direct current voltage.

4. The apparatus of claim 3, wherein the voltage of said first source is greater than the voltage of said second source.

5. The apparatus of claim 3, wherein said voltage divider has two parallel connected branches and each branch comprises an adjustable resistor and a fixed resistor serially connected.

6. In combination, a fixed impedance and a variable impedance connected in series, means for connecting a first and a second source of potential in series and across said serially connected impedances, means for comparing the signal produced across one of said impedances by said first source of potential with a reference signal of opposite polarity to produce a control signal, and means responsive to said control signal for varying said variable impedance and causing said control signal to be maintained at substantially zero potential.

7. In a computer system having a source of alternating current signals and first and second sources of direct current voltage in which the voltage produced by said first source is larger than the voltage produced by said second source, the combination comprising a fixed resistor and a variable resistor connected in series, means for connecting said source of alternating current signals and said first source of direct current voltage in series and across said serially connected resistors, high resistance means for comparing the direct current voltage produced across one of said resistors with the voltage of said second source of direct current voltage in opposite polarity to produce a control signal, control means responsive to said control signal for controlling the resistance of said variable resistor and causing said control signal to be maintained at substantially zero potential, and means for measuring the alternating current signal produced across one of said resistors.

8. The apparatus of claim 7, wherein said control means comprises a direct current amplifier responsive to said control signal, a solenoid responsive to the output of said amplifier, and a plunger controlled by said solenoid and connected to said variable resistor for varying the resistance thereof.

9. The apparatus of claim 8, wherein said variable resistor is a carbon pile type.

10. A computer system comprising a fixed resistor and a carbon pile resistor connected in series, means for connecting a first source of direct current voltage and a source of alternating current voltage in series and across said serially connected resistors, means having a high resistance compared to said carbon pile resistor for comparing the direct current voltage produced across said carbon pile resistor with the voltage of a second source of direct current voltage of opposite polarity to produce a control signal, an amplifier responsive to said control signal, means responsive to the output of said amplifier for controlling the pressure on said carbon pile resistor and causing said control signal to be maintained at substantially zero potential, and means for connecting an indicator across said carbon pile resistor for measuring the amplitude of the alternating current voltage thereacross.

11. A computer system comprising a fixed resistor and a carbon pile resistor connected in series, a source of alternating current voltage and a first source of direct current voltage connected in series, means connecting said serially connected sources of voltage across said serially connected resistors, a second source of direct current voltage, a pair of resistors each having a high resistance compared to the resistance of said carbon pile resistor, said pair of resistors being connected in series between one terminal of said carbon pile resistor and one terminal of said second source of voltage, means connecting the other terminal of said second source of voltage to the other terminal of said carbon pile resistor, said second source of voltage being connected in opposite polarity to the direct current voltage drop across said carbon pile resistor, a direct current amplifier having its input connected across the series circuit comprising said carbon pile resistor and the resistor of said pair of resistors directly connected thereto, a solenoid responsive to the output of said amplifier, a plunger controlled by said solenoid for varying the pressure on said carbon pile resistor, and means for measuring the alternating current signal produced across said carbon pile resistor.

12. In combination, a pair of serially connected adjustable impedances, a pair of serially connected fixed impedances connected in shunt with said serially connected adjustable impedances, means for connecting a first and a second source of potential in series and between the junction between said pair of adjustable impedances and the junction between said pair of fixed impedances, high impedance means connected in shunt across the adjustable impedances for comparing the signal produced across said pair of adjustable impedances by said first source of potential with a reference signal to produce an output control signal, means responsive to said output control signal for simultaneously varying said adjustable impedances in opposite sense and thereby causing said output control signal to be maintained at substantially zero potential, and output means connected in shunt across the adjustable impedances for measuring the signal produced across said pair of adjustable impedances by said second source of potential.

13. In combination, a pair of serially connected adjustable impedances, a pair of serially connected fixed impedances connected in shunt with said serially connected adjustable impedances, means for connecting a source of direct current voltage and a source of alternating current voltage in series and between the junction between said adjustable pair of impedances and the junction between said pair of fixed impedances, high impedance means for comparing the direct current voltage produced across said pair of adjustable impedances with a direct current reference signal to produce a control signal, means responsive to said control signal for simultaneously varying said adjustable impedances in opposite sense and thereby causing said control signal to be maintained at substantially zero potential, and means for measuring the alternating current signal produced across said pair of adjustable impedances.

WILLIS G. WING.

REFERENCES CITED

The following references are of record in the file of this patent:

UNITED STATES PATENTS

| Number | Name | Date |
|---|---|---|
| 2,149,727 | Conklin | Mar. 7, 1939 |
| 2,425,405 | Vance | Aug. 12, 1947 |
| 2,497,883 | Harris | Feb. 21, 1950 |